United States Patent [19]

Herman

[11] Patent Number: 4,541,619
[45] Date of Patent: Sep. 17, 1985

[54] ARTICLE POSITIONING DEVICE

[76] Inventor: Martin A. Herman, 2085 W. 114th St., Cleveland, Ohio 44102

[21] Appl. No.: 557,903

[22] Filed: Dec. 5, 1983

[51] Int. Cl.$^4$ ............................................. B23Q 1/04
[52] U.S. Cl. ......................................... 269/43; 269/47
[58] Field of Search ....................... 269/43, 47, 50-53, 269/99-100, 246, 303, 309, 900, 903, 909; 411/427; 211/94; 16/2; 403/362

[56] References Cited

U.S. PATENT DOCUMENTS

| | | | |
|---|---|---|---|
| 2,389,610 | 11/1945 | Christenson | 403/362 |
| 3,017,657 | 1/1962 | Mills | 403/362 |
| 3,188,715 | 6/1965 | Michalsen | 269/50 |
| 3,501,182 | 3/1970 | Buchsbaum | 403/362 |
| 3,802,027 | 4/1974 | Mueller | 16/2 |
| 4,413,818 | 11/1983 | Lenz | 269/99 |
| 4,445,678 | 5/1984 | George | 269/99 |

Primary Examiner—Robert C. Watson
Attorney, Agent, or Firm—Oldham, Oldham & Weber Co.

[57] ABSTRACT

An article positioning fixture to position a plurality of articles in accurate assocation including an elongate metal base on which a plurality of locator inserts are positioned to receive individual matrix boxes thereon, each box carrying a test article therein and accurately located in relation thereto with common areas of the test articles exposed in accurately positioned relationship to each other, and the fixture also has tapped bushings in the locator inserts for securing the matrix blocks to the locator inserts but which bushings can be replaced readily if worn.

10 Claims, 15 Drawing Figures

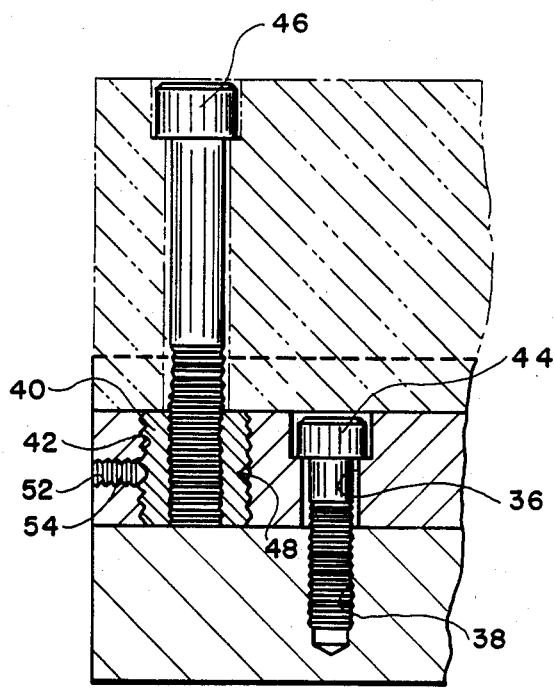
FIG. 6
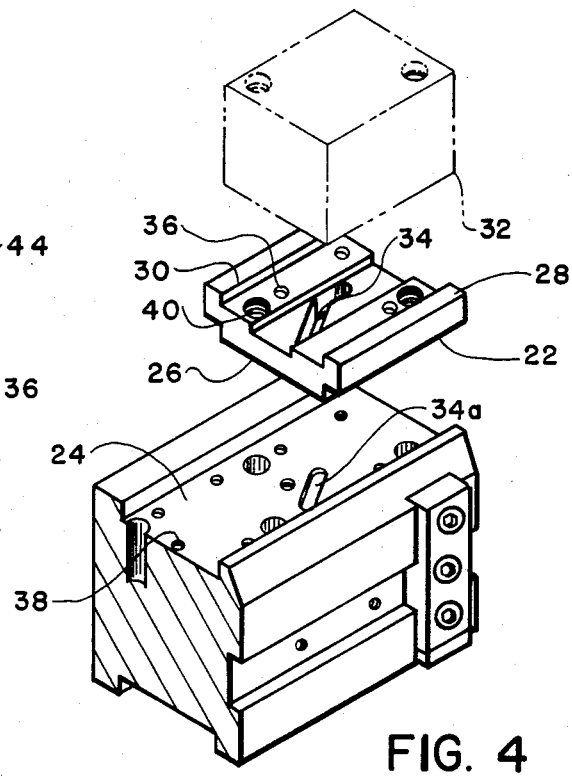
FIG. 4
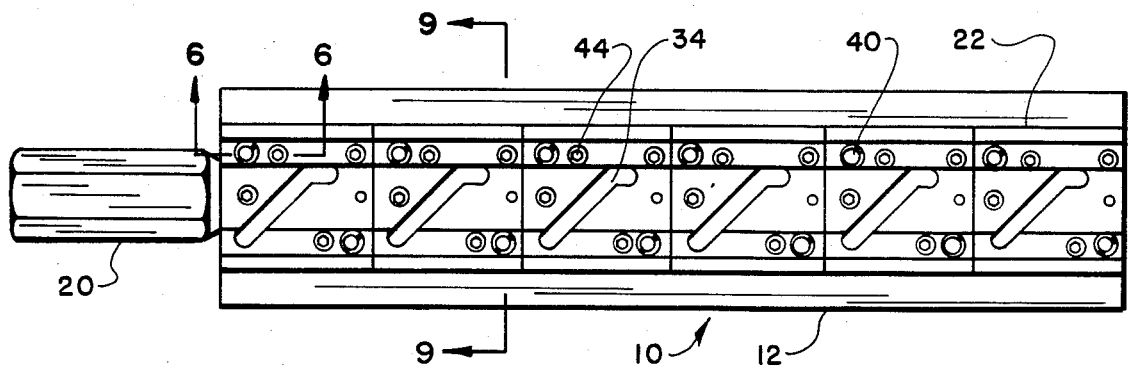
FIG. 5
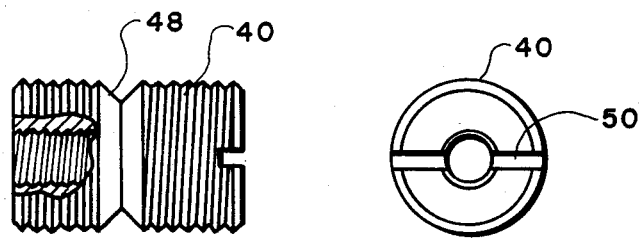
FIG. 7
FIG. 8

ARTICLE POSITIONING DEVICE

BACKGROUND ART

Heretofore, there have been various article positioning fixtures provided for positioning a plurality of test articles in a fixture so that a common machining of finishing operation can be performed on the so positioned test article. Specifically, an open center or hollow fixture has been made from a top plate, a pair of side plates, and a bottom or spacer plate. The top plate has a locating groove extending axially of the fixture and a plurality of inserts or plates are positionable on the fixture to engage the locating groove to be accurately located in the fixture. These locator inserts are adpated to engage and position a matrix box in which a test article or article blank is operatively positioned. The fixture can have a plurality of the matrix boxes individually secured to locator inserts operatively secured to the fixture. The matrix boxes have the test articles positioned in accurately aligned relation so a common machining or grinding operation can be performed on exposed portions, such as ends, of the test articles. This type of an article positioning fixture facilitates machining operations and the production of uniform articles by efficient use of machine action. Of course, the test articles are accurately located in the matrix box and this is provided in known manners by use of other means such as the article centering or balancing construction shown in my prior U.S. Pat. No. 2,999,282.

By making these blocks or fixtures from a plurality of parts, it has been difficult to maintain them in good operative, accurate relationships over a long service life. Furthermore, the locator inserts used in the apparatus have been subject to appreciable wear by the repeated application of a matrix box thereto, securing the matrix block or box to the locator insert, and then the removal of the matrix block from the apparatus. Obviously, a large number of test articles will be positioned in the fixture over a long service life and the attachment and release of the matrix boxes to and from the fixture does cause appreciable wear. For accuracy in maintaining the fixture components in proper relationship with each other, frequently the locator inserts must be replaced, or other repairs made thereto, to keep the fixture functioning accurately and exactly as required.

DISCLOSURE OF THE INVENTION

The general object of the present invention is to provide a new and improved article positioning fixture and to make it from one block of metal whereby a top portion, side portions and bottom portions or walls of the block can be shaped to accurately desired relationships and sizes, which fixture block will have a long operative life and will retain its strength and shape indefinitely.

Another object of the invention is to provide an improved type of locator inserts for use in article positioning fixtures and where replaceable bushings are present in the locator inserts for engaging cap screws or the like for attaching matrix boxes thereto to enable the locator inserts to have new bushings supplied therefore as wear occurs to avoid replacing the entire locator insert because of wear of one hole therein.

Another object of the invention is to provide an improved article locating fixture and locator insert therefore and to provide special bushings in the locator inserts that are tightly held in position within both the top and bottom surfaces of the locator inserts and wherein the position of the bushing is controlled by a set screw engaging a groove in the bushing periphery.

Yet another object of the invention is to provide article positioning fixtures wherein the individual locator inserts used in the fixture can be positioned at desired angular relationships to each other and to the positioning fixture.

The foregoing and other objects and advantages of the invention will be made more apparent as the specification proceeds.

BRIEF DESCRIPTION OF THE DRAWINGS

Reference is now particularly directed to the accompained drawings wherein:

FIG. 4 is an exploded perspective view of a portion of the fixture of FIG. 1 with a locator insert and matrix block being indicated in relation thereto;

FIG. 5 is a plan view of the fixture of FIG. 1 with the matrix boxes removed but with the plurality of locator inserts being secured to the fixture body;

FIG. 6 is an enlarged vertical section through the fixture of FIG. 5 taken on line 6—6 thereof and with the matrix box being indicated in association therewith;

FIG. 7 is a side elevation, partly broken away and shown in section, of a special bushing used in the fixture of FIG. 5;

FIG. 8 is a right side elevation of the bushing of FIG. 7;

When referring to corresponding numbers shown in the drawings and referred to in the specification, corresponding numerals are used to facilitate comparision therebetween.

BEST MODE FOR CARRYING OUT THE INVENTION

Figure 1:
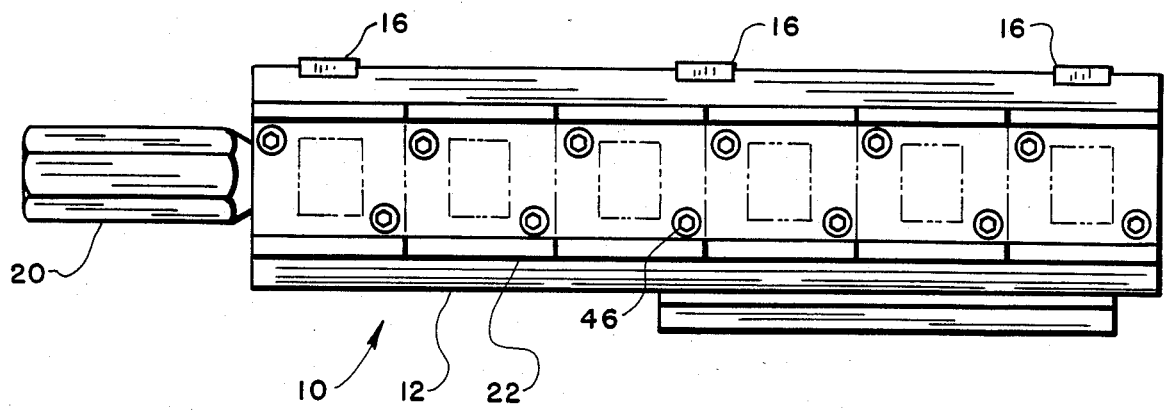
FIG. 1 is a plan view of an article positioning fixture embodying the principles of the invention.

With reference to the details of the construction shown in the accompanying drawings, an article positioning fixture 10 is shown and this fixture 10 includes an elongate metal base block 12 that has a plurality of weight reducing openings 14 provided therein. This base block 12 usually has a plurality of clamp blocks or pads 16 with having flat outer surfaces 18 to aid in positioning the fixture 10 accurately on a support surface or bearing against another object. A further plate 19 also may support the fixture 10 in any manner desired.

Figure 2:
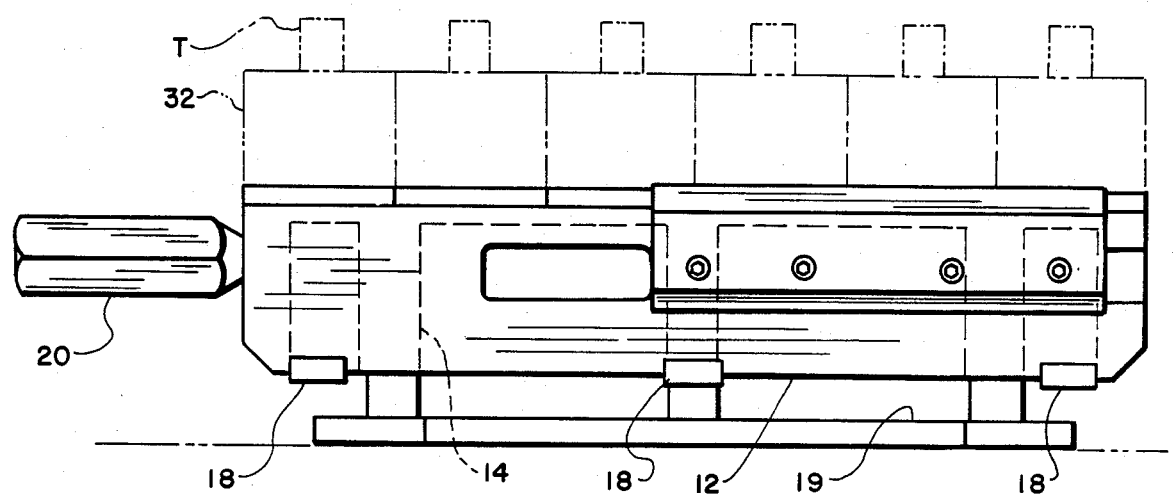
FIG. 2 is a front elevation of the FIG. 1 with the matrix boxes being indicated carried on the upper surface thereof.
Figure 3:
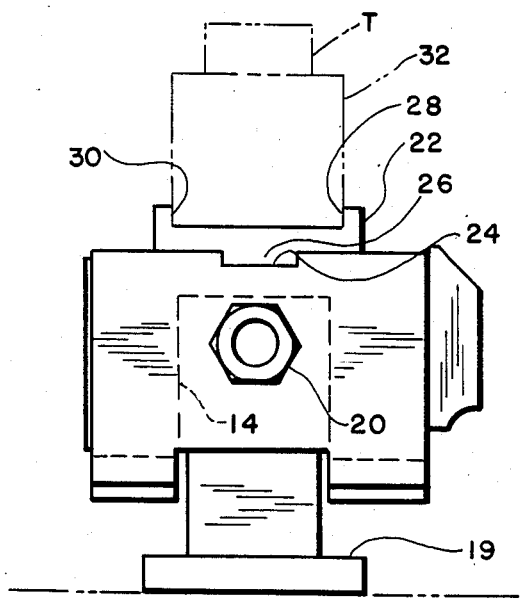
FIG. 3 is a left side elevation of the fixture of FIG. 2.
Figure 9:
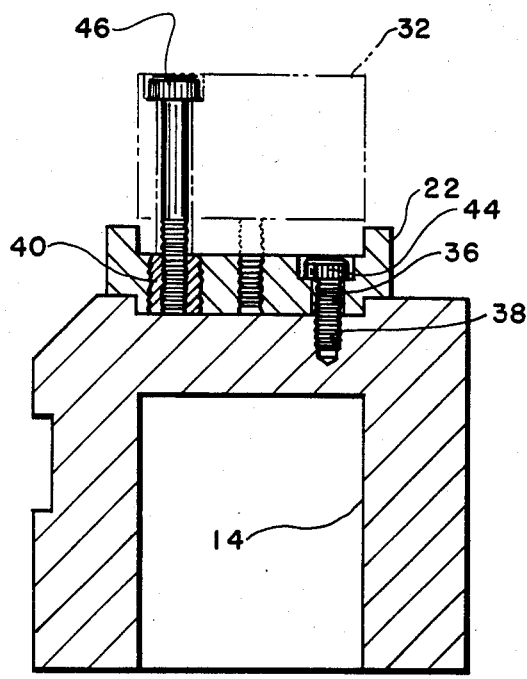
FIG. 9 is a vertical section taken through the fixture of FIG. 5 on line 9—9 thereof.

Any suitable handle 20 can be secured to one end of the base block 12 to aid in moving the fixture and aiding in controlling the position and handling thereof. The fixture 10 positions a plurality of locator inserts 22 on the top surface of this base block 12 and the locator inserts normally are engaged with a longitudinally extending groove 24 formed in the upper surface of the base block 12. The locator inserts have longitudinally extending ribs 26 on their base surfaces engaging the groove 24 and these locator inserts 22 also have a pair of opposed shoulders or flanges 28 and 30 extending up from opposite side edges thereof and which locator insert 22 is each adapted to receive a matrix box 32 between these flanges 28 and 30 to snuggly and accurately position the box therebetween. Such matrix boxes 32 are indicated in FIGS. 1 through 3 of the drawings and they normally have a test article T firmly positioned therein and protruding from top and bottom surfaces thereof. The present invention particularly is adapted for use with matrixes or matrix boxes as shown in my prior U.S. Pat. No. 2,999,282 or to improvements thereon as shown in my copending application Ser. No. 555,161, filed Nov. 25, 1983, and to articles or blanks positioned thereby. Such references teach how a test article can be positioned in the matrix box and be accurately located in relation to the box and/or to external dimensions thereof so that by positioning these matrix boxes accurately one can know the exact position of the test article or blank. The fixture 10 positions a plurality of the test articles and matrix boxes in uniform relation to each other whereby, for example, a common machining operation can be performed on a corresponding surfaces of the test article or blank as exposed in and carried by the article positioning fixture 10.

More details of this article positioning fixture 10 are shown in FIGS. 4, 5 and 6 of the drawings wherein FIG. 5 clearly shows that at each locator insert 22 has an elongate angular slot 34 extending therethrough which slot will receive one end of the test article or blank protruding from the matrix box. The flat center surface of each locator insert 22 also has a plurality of counter bored holes 36 extending therethrough which holes are designed to receive cap screws that extend through the locator insert and engage with corresponding holes 38 formed in the upper surface of the base block 12 for fixedly securing the individual locator inserts to the block. The slot 34 may extend down into this base block 12 as indicated at 34a in FIG. 4 in case the test article extends that far from the matrix box.

The locator inserts normally are spaced slightly from each other and are carried by any suitable base member 12.

In use of the article positioning fixture of the invention, it should be realized that this fixture is used repeatedly for positioning scores of articles therein for finishing, machining, testing or other actions thereon. Consequently, matrix boxes in large numbers are engaged with the individual locator inserts and then are removed therefrom for further processing of finishing action while the fixture 10 is used for another test or positioning action of work blanks. Thus, to secure a matrix box 32 to the individual locator inserts 22 as another feature of the invention, threaded bushings 40 are provided and are removably engaged with tapped apertures 42 formed in related areas of these locator inserts. FIG. 6 shows how suitable cap screws 44 engage the individual locator inserts and extend down to engage with the upper portion of the base block while longer cap screws 46 engage the matrix box 32 to extend down and engage with the threaded bushing 40. These threaded bushings 40 are positioned in removable association with the locator inserts by a threaded rotary connection therebetween and the bushing is hence readily removable by screwing it into our out of the tapped hole in which it is received. To make the bushings operative and retain it against rotation, individual bushings 40 as shown in FIG. 7 have an annular groove 48, V-shape in section that extends around the periphery of the bushing, usually substantially one half way between opposite ends thereof. The upper end of the bushing is slotted at 50 to facilitate the bushing being screwed into and out of engagement with the locator insert. Another important feature, the individual locator inserts 22 have horizontally extending tapped holes 52 formed therein and connecting to the threaded hole in which the bushing 40 is positioned. Such hole receives a pointed end set screw 54 which in turn can engage with this V-shaped groove 48 when the set screw is turned into the hole 52 so as to bear upon the bushing tightly and retain it against rotation. Preferably the end of the set screw is shaped to engage snuggly with the walls of the groove 48 and this will lock the bushing against any rotation whereby the cap screws 46 securing the matrix box in its position can be secured thereto. This anchor means is carried by the locator inserts individually.

Figure 11:
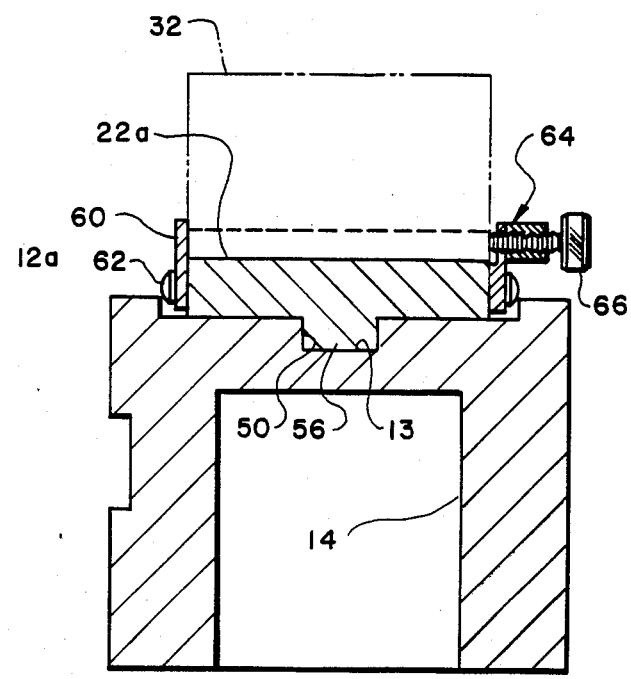
FIG. 11 is a vertical section taken on line 11—11 of FIG. 10.
Figure 10:
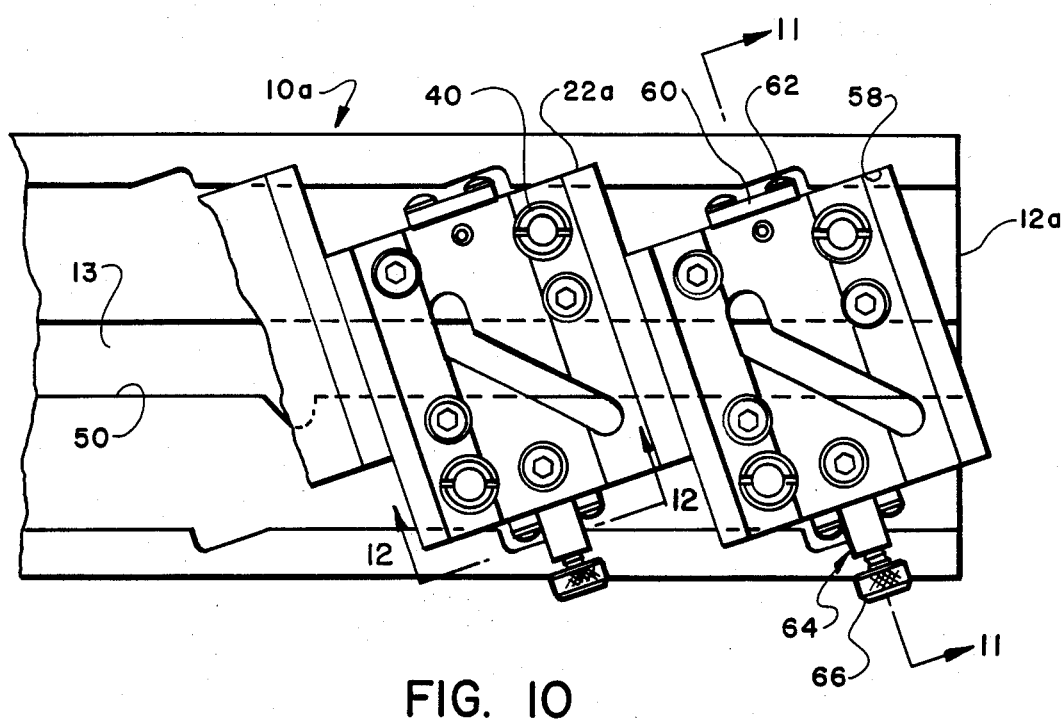
FIG. 10 is a fragmentary plan of a modified fixture embodying the principles of the invention.
Figure 12:
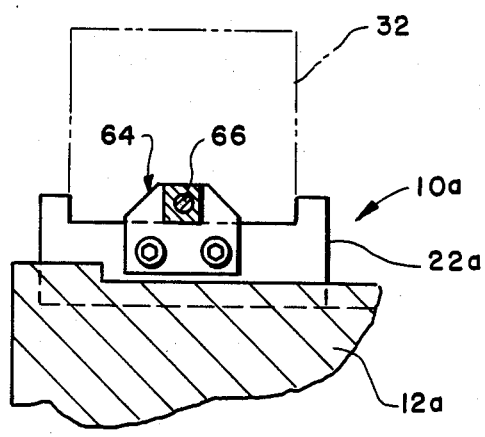
FIG. 12 is a fragmentary vertical section taken on line 12—12 of FIG. 10.

A modified article positioning fixture 10a is shown in FIG. 10 of the invention and in this instance the individual locator insert 22a are designed to be positioned at angles other than directly perpendicular to or parallel with major axes of the base block provided. The relationship or positions of the individual locator inserts 22a on the base block 12a are controlled by means of a longitudinally extending recess 13 as formed in the upper surface of this base block and by a longitudinally extending rib 56 on the base portion of the locator insert 22a as indicated in FIG. 11. Hence, the locator inserts position the article blank in a slightly different manner in this fixture 10a than the corresponding members position test articles in the fixture 10. The opposed flanged edges of the base block 12a usually are notched as at the 58 for engaging corners of these individual locator inserts when the rib 56 is engaged with the slot 50. This positions the transverse axis of the individual locator inserts at an acute angle to the transverse axis or longitudinal axis of the base block 12a.

The locator inserts 22a are suitably secured to the base block 12a as stated before and the matrix boxes 32 are accurately secured in relation to a predetermined edge of the individual locator inserts. Thus, an edge plate or stop 60 is secured to the locator insert 22a at one edge as by cap screws 62 and with such edge block or plate extends upwardly from the upper surface of the locator insert a short distance whereby the matrix box can abut there against as indicated in FIG. 11. To insure that the box bears against this edge stop, there is provided a second edge plate assembly 64 on an opposed edge of the locator insert and such edge assembly 64 has a pusher screw 66 provided therein and adapted to be moved laterally inwardly of the locator insert to bear against the matrix box and force it against the opposed edge stop 60 as best indicated in FIG. 11. Hence, any test article carried by the matrix box can be accurately located in relation to the inner edge of this edge stop 60 and the desired actions can be taken on the test articles after securing the boxes and inserts in position. The matrix box 32 and any article positioned therein is, of course, accurately positioned on one axis of the locator insert 22 by being received between the flanges 28 and 30 and the edge stop 60 and edge assembly 64 will position the box 32 accurately on a second axis of the locator insert.

Figure 14:
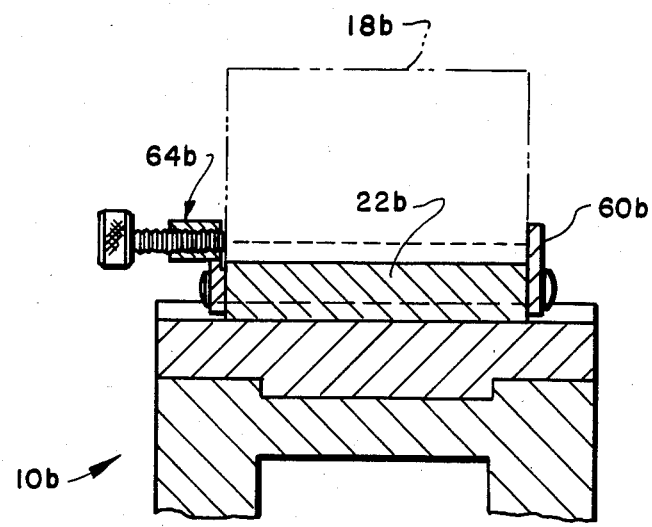
FIG. 14 is a fragmentary vertical section taken on line 14—14 of FIG. 13.
Figure 15:
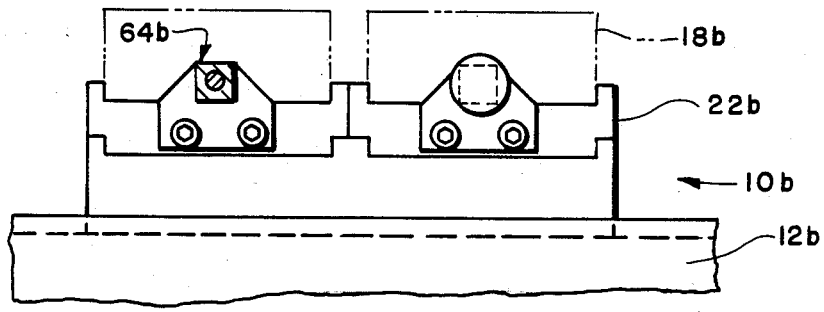
FIG. 15 is an elevation, partially shown in section, taken on line 15—15 of FIG. 13.
Figure 13:
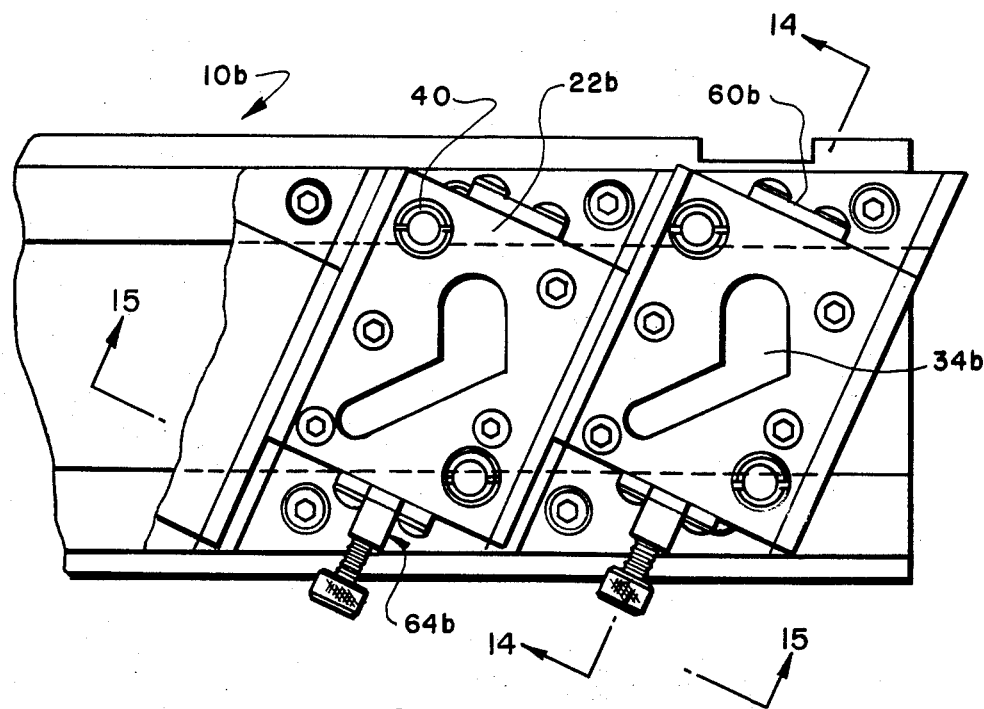
FIG. 13 is a fragmentary plan of a further modified fixture of the invention.

FIGS. 13-15 of the drawings, show yet a further modified type of article positioning fixture 10b of the invention and in this instance, the individual locator inserts 22b have slightly different shaped slots 34b therein for receiving end portions of the test articles as desired. Again, these locator inserts are secured to the top portions of a base block 12b and they are positioned spaced but relation to each other by the cap screws 46 securing them to the base number. Opposed members are provided on a pair of opposed ends of these locator inserts 22b so that edge stops 60b and edge stop assembly 64b are provided for engaging the matrix boxes 18b and accurately positioning them against the edge stop 60 in the fixture. The boxes are fixed to the locator inserts and base as before. Threaded bushings 40 as in the other embodiments of the invention are also provided on the locator inserts 22b for attaching the matrix boxes to the fixture and for facilitating repair and replacement of these bushings as they become worn through repeated use.

In view of the foregoing, it is submitted that a novel and improved article positioning fixture has been provided. This fixture includes the base block made of a one piece unit and which can have any type of a desired weight reducing openings or apertures provided therein. However, the fixture is particularly adapted for continual use for mounting a plurality of test articles individually and for accurately positioning the same. The unit is readily serviced to tolerances and accurate positioning of the matrix boxes in the fixture. Thus, the objects of the invention are believed to be achieved.

What is claimed is:

1. An article positioner fixture for positioning a plurality of articles in accurate association and comprising
   an elongate base block having a locator recess extending the length thereof in its top surface and one or more weight reducing openings in a lower portion thereof;
   a plurality of locator inserts on the top surface of said base block and secured thereto;
   a matrix box secured to each said locator insert on an upper surface thereof;
   said locator inserts operatively engaging said locator recess to be accurately positioned on said base block;
   said locater inserts having holes therein for means for securing said matrix boxes thereto, said matrix boxes being aligned and having article blanks positioned therein with portions of such article blanks exposed,
   flat surfaced rest pads secured to spaced parts of the lower surface of said base block to support the same,
   screw means individually securing a said matrix to a said locator insert, and
   a tapped bushing non-rotatably engaging a said hole in said locator insert for receiving said screw means to enable said bushings to be replaced readily as wear occurs by matrix boxes being secured to and removed from engagement with said locator inserts.

2. An article positioning fixture as in claim 1, where said bushing has an annular groove formed in its periphery, said locator insert having
   a tapped hole therein connecting to said bushing receiving tapped hole, and
   a set screw engaging said tapped hole and bearing on said groove in said bushing for securing said bushing against rotation.

3. An article positioning fixture as in claim 1, where said locator inserts each have a rib on its lower surface, which rib extends at an acute angle to the transverse axis of said locator insert to engage said locator recess in said base block and position all of said locator inserts at desired common angles to the longitudinal centerline of said base block.

4. An article positioner fixture for positioning a plurality of articles for a common machine function thereon and comprising
   a base means;
   a plurality of aligned locator inserts on a surface of said base, and protruding therefrom, said locator inserts being secured to said base means and having tapped holes therein;
   a matrix block secured to each of said locator inserts on the upper surfaces thereof, said locator inserts each having a pair of opposed upwardly extending parallel edge flanges thereon between which a said matrix block is accurately and snuggly received to be positioned thereby against movement in a direction perpendicular to said edge flanges;
   articles being individually positioned in said matrix boxes for common machine actions thereon,
   screw means removably securing a said matrix block to a said locator insert, and
   a tapped bushing having external threads thereon engaging a said tapped hole in said locator insert for receiving said screw means to enable said bushings to be replaced readily, as wear occurs.

5. An article positioning fixture as in claim 4, where said bushing has
   an annular groove formed in its periphery, said locator insert having a horizontally extending tapped hole therein connecting to said bushing receiving tapped hole, and
   a set screw engaging said horizontally extending tapped hole for securing said bushing in position, said bushing having a length of less than the thickness of said locator insert whereby said bushing is positioned within said locator insert when said set screw engages said annular groove.

6. An article positioner fixture for positioning a plurality of articles in accurate association and comprising
   an elongate base block having a locator recess extending the length thereof in its top surface,
   a plurality of locator inserts on the top surface of said base block and secured thereto;
   a matrix box on each said locator insert on an upper surface thereof;
   said locator inserts operatively engaging said locator recess to be accurately positioned on said base block;
   screw means for securing a said matrix box to a said locator insert, and
   a tapped bushing non-rotatably engaged in a said hole in said locator insert for receiving said screw means but removable from said hole to enable said bushings to be replaced readily as wear occurs.

7. An article positioning fixture as in claim 2, where said bushing has
- an annular groove formed in its periphery, said locator insert having a tapped hole therein connecting to said bushing receiving tapped hole, and
- a set screw engaging said tapped hole and engaging said groove for securing said bushing against rotation, said bushing being completely received within said hole.

8. An article positioner fixture as in claim 4, where a stop and adjustable pressure means are carried on a pair of opposed end edges on said locator inserts for engaging a matrix box and accurately and fixedly positioning it therebetween.

9. An article positioning fixture as in claim 1, where said locator inserts each have a pair of opposed upwardly extending edge flanges thereon between which a said matrix block is accurately and snuggly received; and a stop and adjustable pressure means are carried on a pair of opposed end edges on said locator inserts for engaging a matrix box and accurately and fixedly positioning it therebetween on an axis parallel to said edge flanges.

10. An article positioning fixture as in claim 4, where
- an edge stop is secured to each said locator insert and extends upwardly therefrom,
- said edge stop being secured to an edge extending between said edge flanges, and a second edge stop and force screw means is engaged to an opposed edge of said locator insert for engaging a said matrix box to secure it to a said locator insert with an edge abutted against said first edge stop to prevent movement of said matrix box parallel to said edge flanges.

* * * * *